United States Patent [19]

Suga

[11] Patent Number: 5,088,456
[45] Date of Patent: Feb. 18, 1992

[54] VALVE TIMING CONTROL SYSTEM TO ADJUST PHASE RELATIONSHIP BETWEEN MAXIMUM, INTERMEDIATE, AND MINIMUM ADVANCE POSITION

[75] Inventor: Seiji Suga, Kanagawa, Japan

[73] Assignee: Atsugi-Unisia Corporation, Kanagawa, Japan

[21] Appl. No.: 647,290

[22] Filed: Jan. 29, 1991

[30] Foreign Application Priority Data

Jan. 30, 1990 [JP] Japan ............................ 2-20050
Feb. 28, 1990 [JP] Japan ............................ 2-19537[U]

[51] Int. Cl.⁵ .............................................. F01L 1/34
[52] U.S. Cl. ............................ 123/90.17; 123/90.31; 464/2
[58] Field of Search ............... 123/90.15, 90.17, 90.31; 464/2

[56] References Cited

U.S. PATENT DOCUMENTS

| | | | |
|---|---|---|---|
| 4,494,496 | 1/1985 | Nakamura et al. | 123/90.17 |
| 4,601,266 | 7/1986 | Oldfield et al. | 464/2 |
| 4,708,101 | 11/1987 | Hara et al. | 123/90.16 |
| 4,811,698 | 3/1989 | Akasaka et al. | 123/90.17 |
| 4,856,465 | 8/1989 | Denz et al. | 123/90.17 |
| 4,889,086 | 12/1989 | Scapecchi et al. | 123/90.31 |

Primary Examiner—E. Rollins Cross
Assistant Examiner—Weilun Lo
Attorney, Agent, or Firm—Bachman & LaPointe

[57] ABSTRACT

A valve timing control system has a cylindrical gear member disposed between a rotary element rotating in synchronism with engine revolution and a rotary element rotating in synchronism with a camshaft. An intermediate gear means is provided between the rotary elements for adjusting rotational phase relationship to each other. The intermediate gear means is responsive to a fluid pressure in a pressure chamber for causing axial shifting to vary phase relationship between the rotary elements according to the axial position thereof. The pressure chamber is connected to a fluid pressure source via a fluid circuit in which is provided means for controlling fluid pressure to be supplied to the pressure chamber.

9 Claims, 6 Drawing Sheets

VALVE TIMING CONTROL SYSTEM TO ADJUST PHASE RELATIONSHIP BETWEEN MAXIMUM, INTERMEDIATE, AND MINIMUM ADVANCE POSITION

BACKGROUND OF THE INVENTION

1. Field of the Invention

The present invention relates generally to a valve timing control system for an automotive internal combustion engine. More specifically, the invention relates to a valve timing control system which can adjust phase relationship between a crankshaft and a camshaft for adjusting valve opening and closing timing intake and exhaust valves of the internal combustion engine.

2. Description of the Background Art

One typical construction of the conventionally known valve timing control system has been illustrated in the U.S. Pat. No. 4,535,731 assigned to the common assignee to the present invention. In the disclosed construction, a camshaft carries a camshaft synchronous rotary member. On the other hand, a timing sprocket is mechanically connected to a crankshaft via a timing chain for rotation in synchronism with engine revolution. An intermediate gear member of generally cylindrical construction is disposed between the timing sprocket and the camshaft synchronous rotary member. The intermediate gear member has helical gear teeth formed at least one of the inner and outer periphery thereof. The intermediate gear member is axially shiftable by a hydraulic means for causing phase shift between the crankshaft and the camshaft.

In the shown construction, the intermediate gear member is shiftable between a first and initial position and a second shifted position. At the first position of the intermediate gear member, the phase relationship between the camshaft and the crankshaft is maintained at initial phase relationship. When the intermediate gear member is shifted to the shifted position, the phase relationship is vary to advance the valve timing relative to the engine revolution.

Though such prior proposed valve timing control system is successful to improve the engine driving performance in certain aspect, two-way adjustment of the valve timing, i.e. initial timing and advanced timing is not satisfactory in view of the valve timing control precisely corresponding to the engine driving condition.

SUMMARY OF THE INVENTION

Therefore, it is an object of the present invention to provide a valve timing control system which permits precise adjustment of the valve timing in relation to an engine driving condition.

In order to accomplish aforementioned and other objects, a valve timing control system, according to the present invention, has a cylindrical gear member disposed between a rotary element rotating in synchronism with engine revolution and a rotary element rotating in synchronism with a camshaft. An intermediate gear means is provided between the rotary elements for adjusting rotational phase relationship to each other. The intermediate gear means is responsive to a fluid pressure in a pressure chamber for causing axial shifting to vary phase relationship between the rotary elements according to the axial position thereof. The pressure chamber is connected to a fluid pressure source via a fluid circuit in which is provided means for controlling fluid pressure to be supplied to the pressure chamber.

According to one aspect of the invention, a valve timing control system for an automotive vehicle, comprises:

an engine revolution synchronous rotary element rotatingly driven in synchronism with engine revolution;

a camshaft for driving intake and/or exhaust valve of an induction system of the engine;

a camshaft synchronous rotary element rotating in synchronism with engine revolution;

a phase adjusting means disposed between the engine revolution synchronous rotary element and the camshaft synchronous rotary element for adjusting rotational phase relationship between the rotary elements for adjusting rotational phase of the camshaft relative to engine revolution system;

a control means associated with the phase adjusting means, for actuating the phase adjusting means, for shifting the phase adjusting means between a minimum advance position corresponding to a predetermined minimum advanced phase of the camshaft relative to the engine revolution cycle and a maximum advance position corresponding to a predetermined maximum advanced phase of the camshaft relative to the engine revolution cycle, the control means actuating the phase adjusting means to the minimum advance position in response to low engine load condition and to the maximum advance position in response to high engine load; and means responsive to a predetermined medium load between the load and high load for restricting magnitude of shifting of the phase adjusting means to a predetermined medium advance position in which magnitude of phase shift of the camshaft is greater than that at the minimum advance position and smaller than that at the maximum advance position.

In the preferred construction, the controlling means may comprise an electrical control unit which monitors engine driving condition to produce a valve timing control signal depending upon the engine load, and a hydraulic means including a pressure chamber defined in opposition to the phase adjusting means for exerting hydraulic force to shift the phase adjusting means, and a fluid pressure source unit for supplying pressurized fluid to the pressure chamber via a hydraulic circuit. The control unit may produce a first valve timing control signal in response to an engine load higher than a predetermined medium engine load criterion, and the hydraulic circuit includes a flow control valve selectively connecting the fluid pressure source unit to a supply line connected to the pressure chamber and to a drain path, the flow control valve being responsive to the first valve timing control signal to establish fluid communication between the fluid pressure source and the supply line. The control unit may produce a second valve timing control signal in response to an engine load higher than a predetermined high engine load criterion, and the hydraulic circuit includes a pressure control valve serving the shifting magnitude restricting means for adjusting the fluid pressure in the pressure chamber, the pressure control valve adjusting the fluid pressure in the pressure chamber at a predetermined first magnitude for placing the phase adjusting means to the predetermined medium advance position while the second valve timing control signal is absent and at a predetermined second magnitude for placing the phase adjusting means to the predetermined maximum advance position in response to the second valve timing control signal. The pressure control valve may include a pressure relief means active while the second control signal is absent, to drain fluid pressure higher than the predetermined first magnitude.

In the alternative embodiment, the pressure chamber may be separated into first and second chambers by a movable member, the movable member being oriented adjacent the phase adjusting means for shifting in phase advancing direction together with the phase adjusting means in response to the fluid pressure in the first chamber and the phase adjusting means being shifted in the phase advancing direction independently of the movable member in response to the fluid pressure in the second chamber. In such case, the hydraulic circuit may include valve means operable between a first position for establishing fluid communication between the supply line and the first chamber and a second position for establishing fluid communication between the supply line and the second chamber. The control unit may produce a second valve timing control signal for driving the valve means between the first and second positions. The shifting magnitude restricting means may comprise a mechanical stopper means restricting stroke of the movable member which shifts in phase advancing direction together with the phase adjusting means in response to the fluid pressure in the first chamber.

According to another aspect of the invention, a valve timing control system comprises:

an engine revolution synchronous rotary element driven by an output of an internal combustion engine;

a camshaft assembly including a driven member secured to a camshaft by means of a fastening bolt engaging with an axial bore formed in the camshaft;

an intermediate member disposed between the rotary element and the camshaft for transmitting rotating torque from the rotary element to the driven member with a given phase relationship between the rotary element and the driven member, the intermediate member being thrustingly movable for adjusting the phase relationship;

a first and second pressure chambers formed at both sides of the intermediate member for positioning the intermediate member at a position where pressure balance is established;

a first fluid path defined through the fastening bolt for fluid communication between the first pressure chamber and a pressure source;

a second fluid path defined between the fastening bolt and the inner periphery of the axial bore for establishing fluid communication between the second pressure chamber and the pressure source; and a flow control valve means responsive to a control signal commanding desired phase relationship between the rotary element and the driven member establishing and blocking the first and second fluid paths.

The first pressure chamber may be selectively communicated with a first supply line supplying pressurized fluid and a first drain line draining pressurized fluid across a first flow control valve, and the second pressure chamber is selectively communicated with a second supply line and a second drain line across a second flow control means, and the first and second flow control valve means are operated in alternative fashion so that when one of the first and second pressure chambers is communicated to associate one of the first and second supply lines, the other is communicated with associated one of the first and second drain lines.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
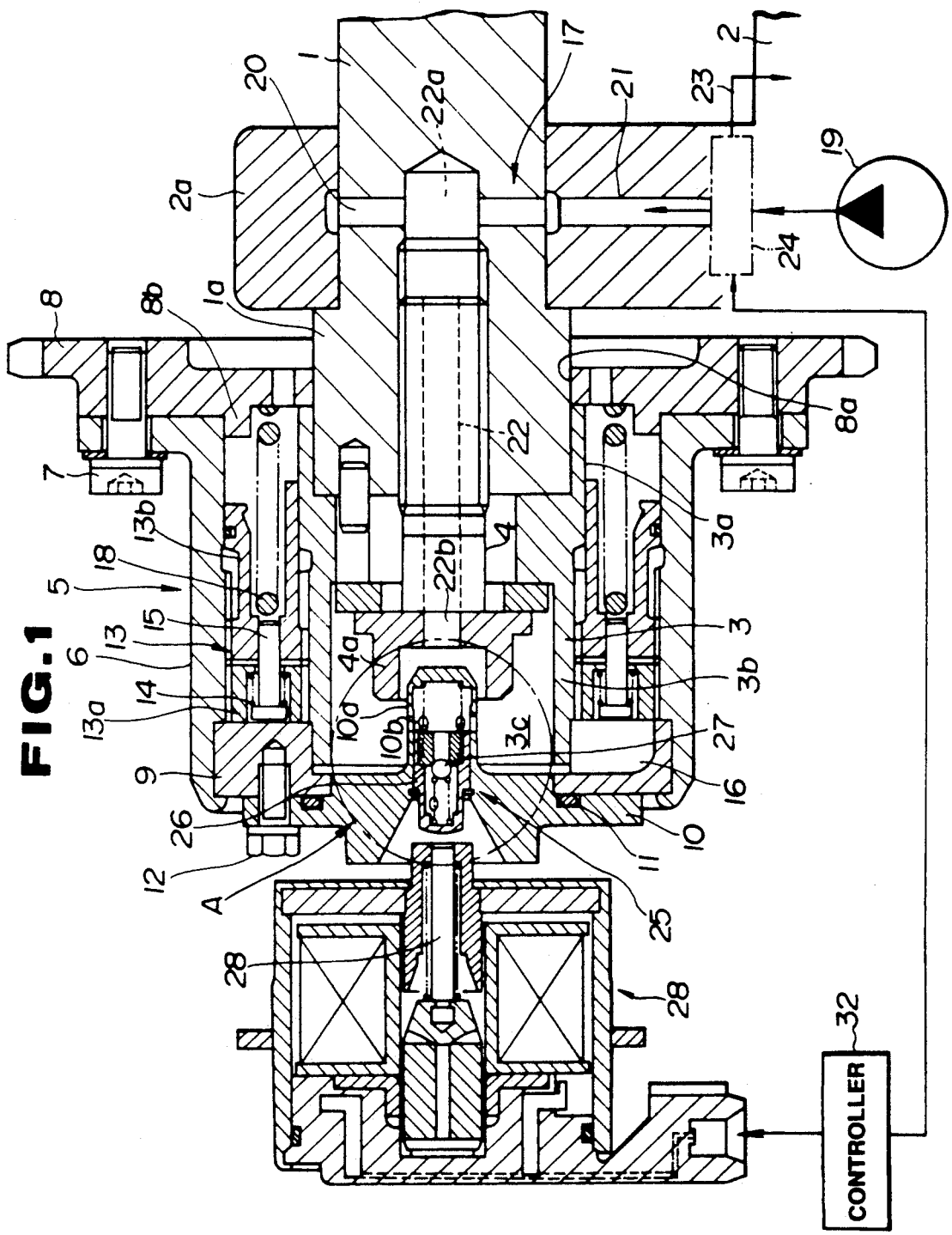
FIG. 1 is a section of the first embodiment of a valve timing control system according to the present invention.

Referring now to the drawings, particularly to FIG. 1, the preferred embodiment of a valve timing control system, according to the present invention, is applied for double over-head camshaft (DOHC) type internal combustion engine. However, the similar construction with minor modification if required, is applicable even for single over-head camshaft (SOHC) type internal combustion engine. As show in FIG. 1, a camshaft 1 is rotatably supported by a cam bearing 2a of a cylinder head 2. An essentially cylindrical rotary member 3 is secured on the axial end portion 1a of the camshaft 1, which cylindrical member will be hereafter referred to as "inner cylinder member." The cylindrical rotary member 3 is fixed onto the axial end 1a of the camshaft 1 by means of a fastening bolt 4. A timing sprocket assembly 8 is connected to a crankshaft (not shown) via a timing chain for driving in synchronism with the engine revolution. A cylindrical member 6 is rigidly fixed to the timing sprocket 5 for rotation therewith. The rotary cylindrical member 6 is formed with an internal gear teeth, which cylinder member will be hereafter referred to as "outer cylindrical member."

The inner cylindrical member 3 had a base section 3a rigidly connected to the axial end 1a of the camshaft 1. On the other hand, the cylindrical rotary member 3 is formed with external gear teeth. The outer cylindrical member 6 has greater axial length than that of the section 3b of the cylindrical rotary member 3. The timing sprocket assembly 5 comprises the outer cylindrical member 6 and a gear section 8 which is rigidly fixed to the cylindrical member by means of fastening bolts 7. The gear section 8 has a center opening 8a, through which the axial end 1a of the camshaft 1 is inserted for rotatably supporting the timing sprocket assembly. An annular ring 9 is clamped on the inner periphery of the outer cylindrical member 6 in the vicinity of the axial end. A retainer plate 10 is fixed to the axial end of the outer cylindrical member 6 together with a seal ring 11 by means of fastening bolts 12.

Between, inner and outer cylindrical members 3 and 6, a cylindrical gear assembly 13 which serves as an intermediate gear, is disposed. The cylindrical gear assembly 13 comprises a mutually separated two gear elements 13a and 13b. The gear elements 13a and 13b are connected to each other by means of a spring 14 and a connecting pin 15. On both of the inner and outer periphery of the gear elements 13a and 13b, spiral gear teeth are formed. The inner spiral gear teeth on the inner periphery of the cylindrical gear assembly 13 meshes with the gear teeth formed on the outer periphery of the inner cylindrical member 3b. On the other hand, the outer spiral gear teeth on the outer periphery of the cylindrical gear assembly 13 meshes with the inner gear teeth formed on the inner periphery of the outer cylindrical member 6. The axial end of the gear element 13a remote from the gear element 13b, opposes with the annular ring 9 so that axial motion toward left in FIG. 1 is restricted by abutting the axial end onto the annular ring. On the other hand, the axial end of the gear element 13b remote from the gear element 13a opposes an annular projection 8b axially extending from the radial section of the gear member 8. Therefore, the motion stroke of the cylindrical gear member 13 toward right is restricted by abutting the axial end of the gear element 13b onto the annular projection 8b.

The cylindrical gear assembly 13 is driven axially in back and forth by means of a drive mechanism. The drive mechanism includes a hydraulic means for driving the cylindrical gear assembly 13 in backward (toward right in FIG. 1). The hydraulic means comprises a pressure chamber 16 defined between the annular ring 9 and the gear element 13a. In the shown embodiment, the pressure chamber 16 is defined by forming groove on the annular ring. The pressure chamber 16 is connected to a fluid pump 19 as a pressurized fluid source, via a hydraulic circuit 17. On the other hand, a mechanical coil spring 18 is disposed between the radial section of the gear member 8 and the gear element 13b.

The hydraulic circuit 17 includes a supply path 21 extending through the cam bearing 2a of the cylinder head 2. The supply path 21 is communicated with radial path 20 via annular groove formed on the inner periphery of the cam bearing. The radial path 20 is communicated with an axial path 22 via an axial bore 22a defined in the bottom portion of the threaded bore to which the fastening bolt 4 for securing the inner cylindrical member 3 onto the axial end of the camshaft. The axial path 22 is communicated with an axial opening 22b formed through the fastening bolt 4. The axial opening 22b opens to the recess formed on the bolt head 4a. The recess of the bolt head 4a is communicated with a chamber 3c defined in the inner cylindrical member 3. The chamber 3c is communicated with the pressure chamber 16.

An electromagnetic flow control valve 24 is provided in the hydraulic circuit 17. The flow control valve 24 selectively establish fluid communication between the fluid pump 19 and one of the supply line 21 and a drain line 23. Furthermore, a pressure control mechanism 25 is provided for controlling fluid pressure in the pressure chamber 16. The pressure control mechanism 25 comprises a bottomed cylindrical extension 10a extending from the inner periphery of the retainer plate 10. A valve body 26 is disposed within the internal space of the cylindrical extension 10a for thrusting motion therein. The valve body 26 carries a ball valve 27 disposed therein. The valve body 26 is also associated with an electromagnetic actuator 28.

Figure 2:
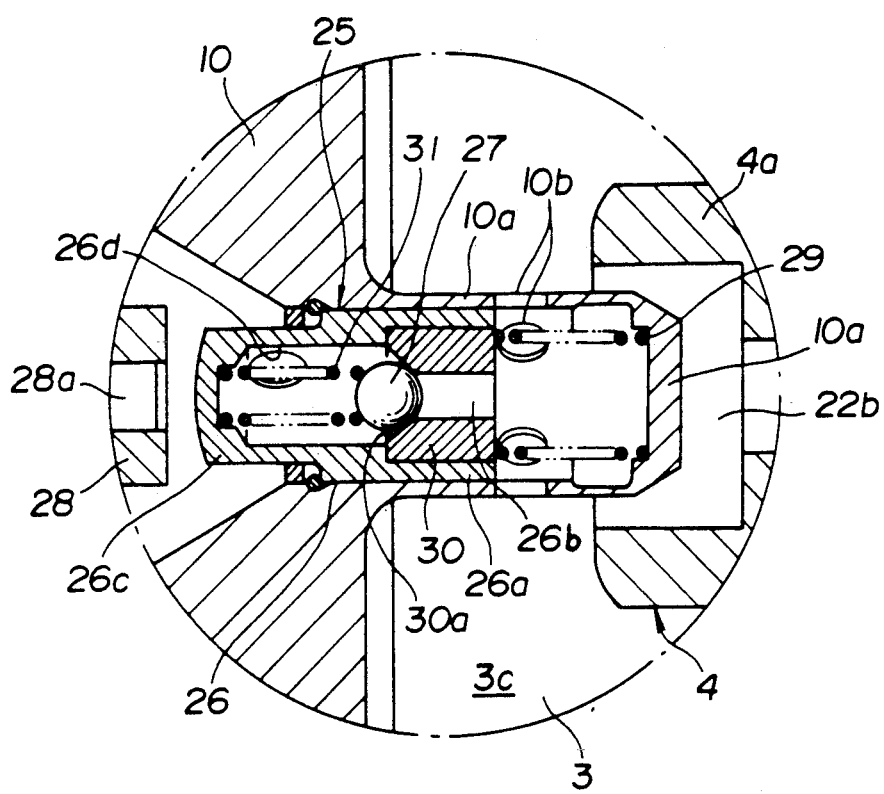
FIG. 2 is an enlarged section of the major part of the first embodiment of the valve timing control system.

As shown in FIGS. 1 and 2, the valve body 26 is movable for selectively establishing and blocking fluid communication between the chamber 3c and the interior space in the cylindrical extension 10a via a plurality of radial openings 10b oriented at circumferentially offset positions of the cylindrical extension 10a. The interior space of the extension 10a is communicated with the interior space of the valve body 26 via an axial opening 26b defined through a fluid path fitting 30. The fluid path fitting 30 has an essentially conical valve seat surface 30a on which is seated the ball valve 27 with a biasing force exerted by a coil spring 31. The spring force of the coil spring 31 may be set at any desired magnitude for determining a set pressure of the valve assembly to open. The ball valve 27 adjusts the fluid flow path area to be defined between the ball valve and the valve seat surface. The interior space of the valve body 26 is communicated with a conical opening defined through the retainer plate 10. On the other hand, the valve body 26 is biased outwardly by means of a coil spring 29.

The outer end of the valve body 26 opposes a plunger 28a of the electromagnetic actuator 28. The electromagnetic actuator 28 is responsive to an electric control signal which is, in practice, ON/OFF signal. When the control signal is HIGH level (ON), the actuator 28 is energized to protrude the plunger 28a from the actuator housing to push the valve body 26 toward right in FIG. 1. By shifting of the valve body 26 toward right, the valve body closes radial openings 10b to block fluid communication between the chamber 3c and the interior space of valve body 26. By this, the chamber 3c is blocked from fluid communication with the conical opening of the retainer plate 10. Therefore, at this time, the pressurized fluid supplied from the fluid pump 19 is introduced into the pressure chamber 16 for increasing the fluid pressure therein. On the other hand, when the control signal is LOW level (OFF), the actuator 28 is maintained deenergized state. In such condition, the valve body 26 is maintained at the initial position by the spring force of the coil spring 31. As a result, the radial openings 10b are held open to permit fluid communication between the chamber 3c and the interior space of the valve body 26. The pressure in the interior space of the valve body is exerted on the ball valve 27. Therefore, when the pressure in the interior space of the valve body becomes higher than the set spring force of the spring 31, the ball valve is shifted to permit discharging of the pressurized fluid through the conical opening of the retainer plate 10.

In the practical operation, the pressure control signal is maintained LOW level while the engine load is LOW. At this time, the LOW level pressure control signal is supplied to the actuator 28. At the same time, a flow control signal is supplied to the flow control valve 24 to establish fluid communication between the fluid pump 19 and the drain path 23 and to block fluid communication between the fluid pump and the supply path. Since the control signal supplied to the actuator 28 is maintained LOW level, actuator 28 is held deenergized to maintain the fluid pressure in the pressure chamber 16 at low level as set forth above. Therefore, the cylindrical gear assembly 13 is maintained at the position seated on the ring member 9. At this position, magnitude of phase advance of the camshaft 1 relative to phase of the engine revolution is maintained maximum. Therefore, valve close timing becomes relatively late.

It should be appreciated, the control pressure in the pressure chamber is then maintained in substantially constant because the axial end of the axial path 26 is closed by the ball valve 27.

When the engine load condition becomes medium load state, the flow control signal is reversed to switch fluid path to establish fluid communication between the fluid pump 19 and the supply path 21 and block fluid communication between the fluid pump and the drain path. At this time, the pressure control signal is maintained LOW level to maintain the actuator 28 deenergized. As a result, part of the pressurized fluid is introduced into the pressure chamber 16 and another part of the pressurized fluid is introduced into the interior space of the valve body 26. Therefore, the fluid pressure in the pressure chamber 16 is increased to cause shifting of the cylindrical gear member 13 toward right in FIG. 1. Rightward shifting of the cylindrical gear member 13 increases spring force of the spring 18. The fluid pressure is increased as relative pressure balance between the fluid force in the pressure chamber and the spring 18. The increased fluid pressure in the pressure chamber 16 is introduced into the interior space of the valve body 26 and exerted on the ball valve 27 via the axial path. As set forth, when the fluid pressure in the interior space of the valve body 26 becomes greater than the set force of the spring 31, the ball valve is shifted to discharge the pressurized fluid until the force balance between the fluid force and spring force is established. Therefore, the cylindrical gear member can be maintained at a predetermined intermediate position. As a result, the phase relationship advanced in a predetermined magnitude from the minimum advance position can be established and maintained.

When the engine load is grown to HIGH, the pressure control signal becomes HIGH level to energize the actuator 28. By this, the valve body 26 is shifted to block fluid communication between the conical path and the chamber 3c. Therefore, the pressurized fluid is supplied to the pressurized fluid into the pressure chamber 16 to increase the fluid pressure. As a result, the fluid pressure in the pressure chamber 16 is further increased to fully shift the cylindrical gear member until the gear element 13b comes into contact with the annular projection 8b. The phase relationship of the camshaft relative to the timing sprocket thus becomes maximum advanced position.

Figure 3:
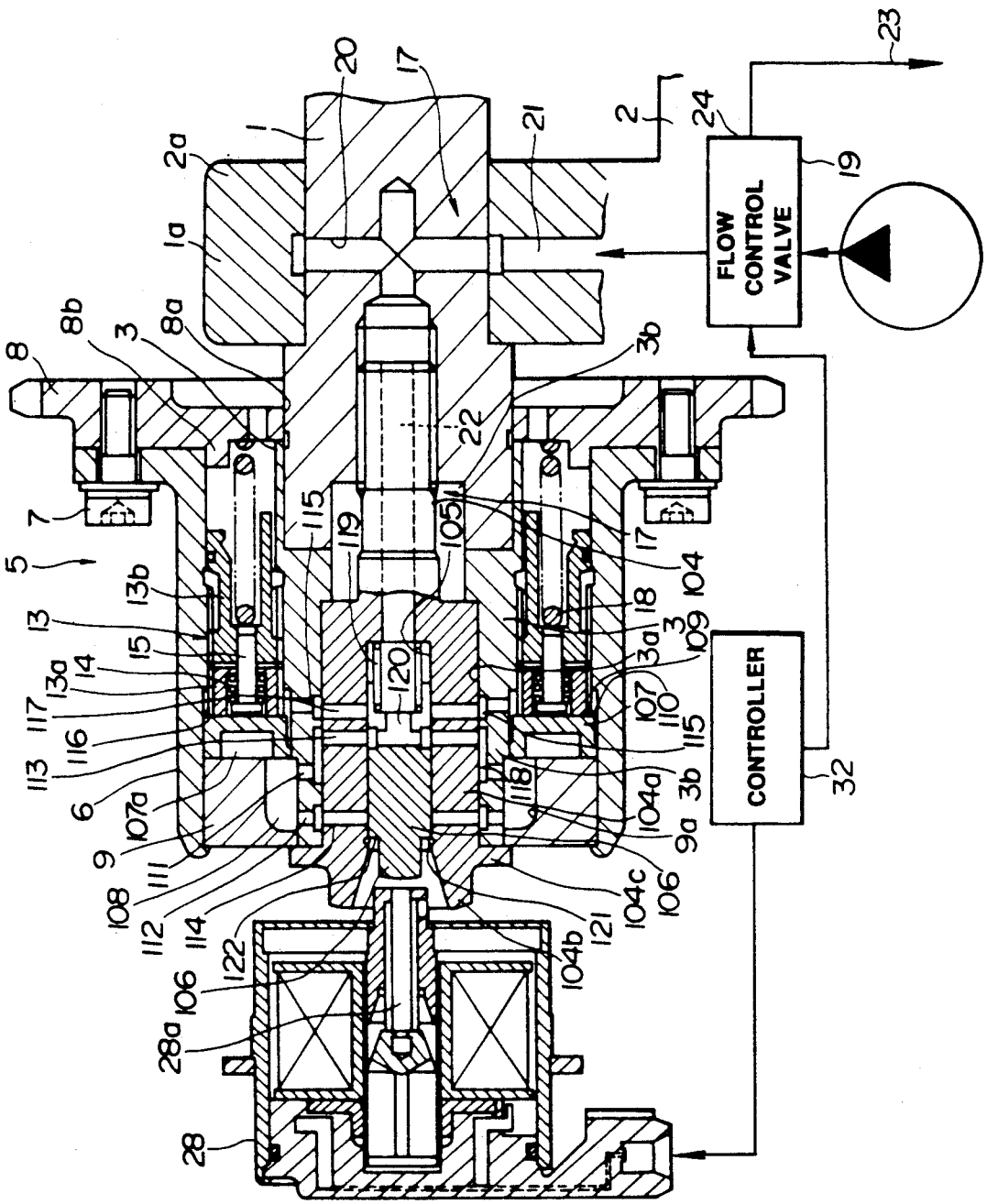
FIG. 3 is a section of the second embodiment of a valve timing control system according to the present invention.

FIG. 3 is the second embodiment of a valve timing control system according to the present invention. The shown embodiment is differentiated from the former embodiment in the pressure control mechanism. The components common to the former embodiment will be represented by the same reference numerals and neglected the detailed discussion in order to avoid redundancy.

As can be clear from FIG. 3, a fastening bolt 104 which is securing the inner cylindrical member 3 onto the axial end of the camshaft 1 has an elongated bolt head section 104a having an outer end 104b projected frontwardly from the axial end of the inner cylindrical member 3. As can be seen, the bolt head section 104a has an external diameter substantially corresponding to the greater diameter section 3a of an axial bore 3b defined through the inner cylindrical member 3. The fastening bolt 104 has a radially extending flange 104 abutting against the axial end of the inner cylindrical member 3. Also, the fastening bolt 104 is formed with an axially extending valve bore 105, in which is thrustingly received a pressure control valve spool 106.

In the shown embodiment, a ring member 107 which has channel-shaped cross-section is disposed between the clearance between the inner and outer cylindrical member 3 and 6 adjacent the gear element 13a. The ring member 107 is movable in axial direction. The ring member 107 directs the annular groove 107a formed therein to the pressure chamber 107. As can be seen, the groove 107a of the ring member 107 partly overlaps the groove 9a formed on the ring member 9 for defining a first pressure chamber 108 for maintaining fluid communication therebetween. As can be seen from FIG. 3, the internal diameter of the ring member 107 is slightly smaller than that of the cylindrical gear assembly 13 so that it may abut onto a shoulder 109 formed on the inner periphery of the outer cylindrical member 6. Therefore, the stroke of thrusting movement of the ring member 107 is limited in a range defined by the ring member 9 and the shoulder 109. A second pressure chamber 110 is defined between the opposing axial ends of the ring member 107 and the gear element 13a as clearly shown in FIGS. 4 and 5.

The first pressure chamber 108 is in fluid communication with a first supply port 111 and a drain port 112 respectively formed in the axial front end portion 3b of the inner cylindrical member 3. The first supply port 111 is constantly in fluid communication with a radial path 113 extending radially through the bolt head section 104a. Similarly, the drain port 112 is constantly in fluid communication with a radial path 114 extending radially through the bolt head section 104a, via an annular groove 118. On the other hand, the second pressure chamber 110 is in fluid communication with a second supply port 115 via an annular groove 116 formed on the outer periphery of the inner cylindrical member 3. The second supply port 115 is in constantly in fluid communication with a radial path 117. The radial paths 112, 114 and 117 are open to the axial bore 105 in the bolt head section 104a.

The valve spool 106 is associated with a coil spring 119 so as to be constantly biased toward front (toward left in FIG. 3). The valve spool 106 is formed with a valve path 120 communicating with the axial bore 105. The valve path 120 has a radial section which is selectively aligned with one of the first and second radial path 112 and 114. The frontward movement of the valve spool 106 is limited by a stopper ring 121. The valve spool 106 is initially placed at the position shown in FIGS. 3 and 4 by the spring force of the coil spring 119. At the intial position, the radial section of the valve path 120 is held in fluid communication with the annular groove 3b and whereby in fluid communication with the first pressure chamber 108. At this position, the radial paths 114 and 117 are blocked from fluid communication by the valve spool 106. Therefore, when the fluid pump is driven to increase the fluid pressure in the supply line 17, the increased pressure is solely introduced into the first pressure chamber 108 to increase the fluid pressure in the first pressure chamber.

With the increased fluid pressure in the first pressure chamber 108, the cylindrical gear assembly 13 together with the ring member 107 rearwardly to cause phase shifting in valve timing advancing direction. Travel of the ring member 107 in valve timing advancing direction is limited by the shoulder 109 so that further axial movement will never occur after the ring member 107 comes into contact with the shoulder 109. Therefore, the stroke of the cylindrical gear member 13 is limited to the limited stroke of the ring member 107.

On the other hand, when the electromagnetic actuator 28 becomes active to protrude the plunger 28a, the valve spool 106 is axially shifted against the spring force of the spring 119. Then, fluid communication between the radial path 117 and the axial bore 105 is established for introducing the pressurized fluid into the second pressure chamber 110. At the same time, the radial path 114 is also communicated with the axial bore 105 by the travel of a shoulder 122 of the valve spool 106 thereacross. Therefore, the pressurized fluid is introduced into the second pressure chamber to cause further axial movement of the cylindrical gear member 13 in valve timing advancing direction until the axial end of the gear element 13b comes into contact with the annular projection 8b. Therefore, the valve timing can be adjusted to the most advanced position.

Valve timing adjustment is performed substantially the same manner as that discussed with respect to the former embodiment. Namely, in response to low engine load, the controller 32 outputs LOW level flow control signal and LOW level pressure control signal. As a result, the fluid pump 19 is directly connected to the drain line 23 and is blocked from fluid communication with the supply line 21. Because pressurized fluid is not supplied to the pressure chambers 108 and 110, the cylindrical gear member 13 is maintained at the initial position. Therefore, the phase relationship between the timing pulley 5 and the camshaft 1 is maintained at initial minimum advanced position.

Figure 4:
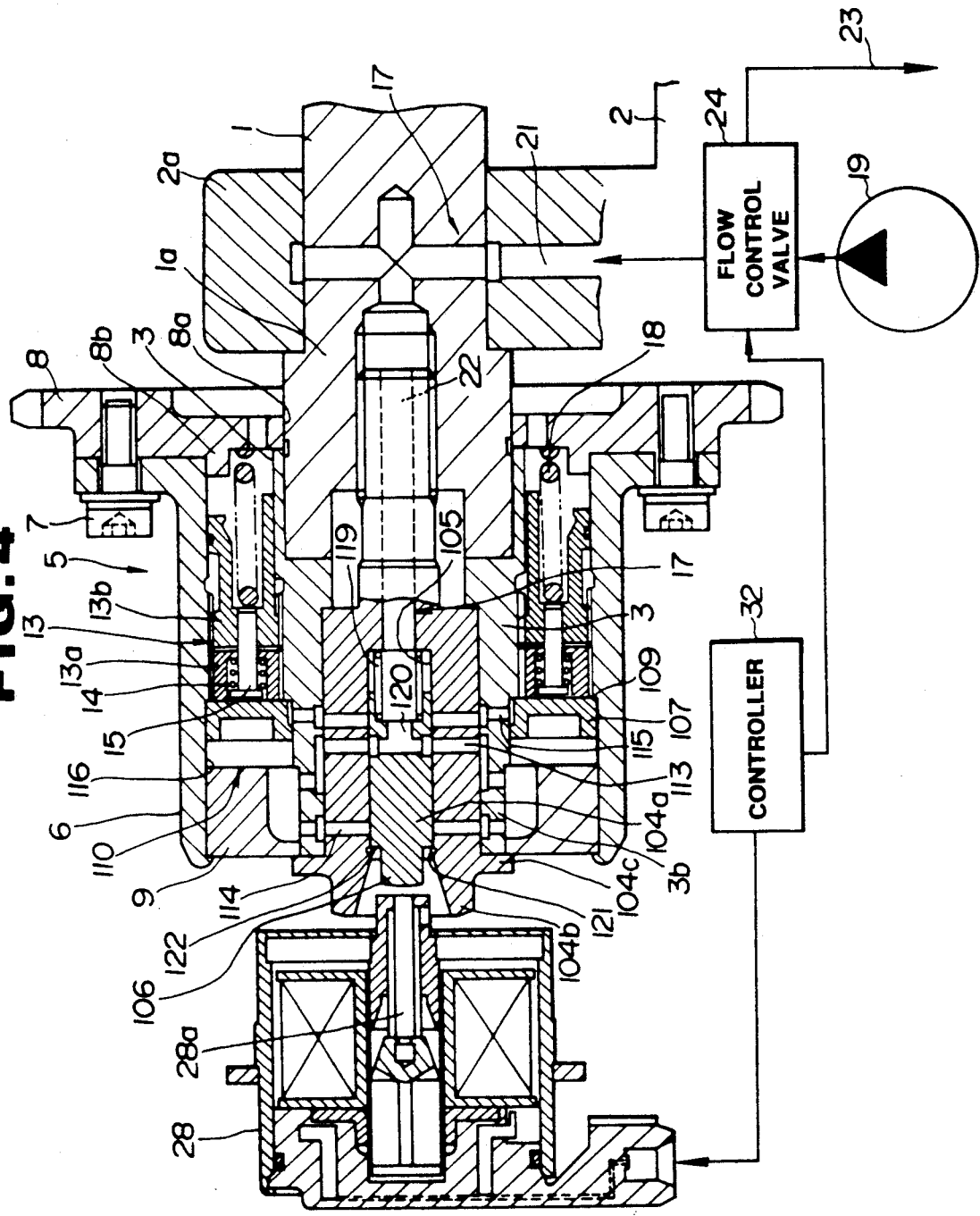
FIG. 4 is a similar section to FIG. 3 but showing different operational state to that of FIG. 3, which illustrates phase shifted state to intermediate phase shifted position.

On the other hand, when the engine load is grown in the medium load range, HIGH level flow control signal is output from the controller 32 to the flow control valve 23. At this time, the pressure control signal is maintained at LOW level. In response to the HIGH level flow control signal, fluid communication between the fluid pump 19 and the supply line 21 is established. The pressurized fluid flows through the hydraulic circuit 17, i.e. through the supply line 21, the radial path 20, axial path 22 and the axial bore 105. At this time, since the pressure control signal is maintained at LOW level, the electromagnetic actuator 28 is maintained in deenergized state. Therefore, the valve spool 106 is maintained at the intial state to establish fluid communication between the valve path 120 and the first supply port 111 via the radial path 113 and the annular groove 118. Therefore, the pressurized fluid is supplied to the first pressure chamber 108. As a result, the fluid pressure in the first pressure chamber 108 is increased to overcome the spring force of the spring 18. Therefore, the cylindrical gear assembly 13 is driven in advancing direction together with the ring member 107, as shown in FIG. 4. Stoke of the cylindrical gear assembly 13 and the ring member 107 is terminated when the ring member abut against the shoulder 109. Therefore, the cylindrical gear assembly 13 can be accurately placed at the predetermined medium load position.

Figure 5:
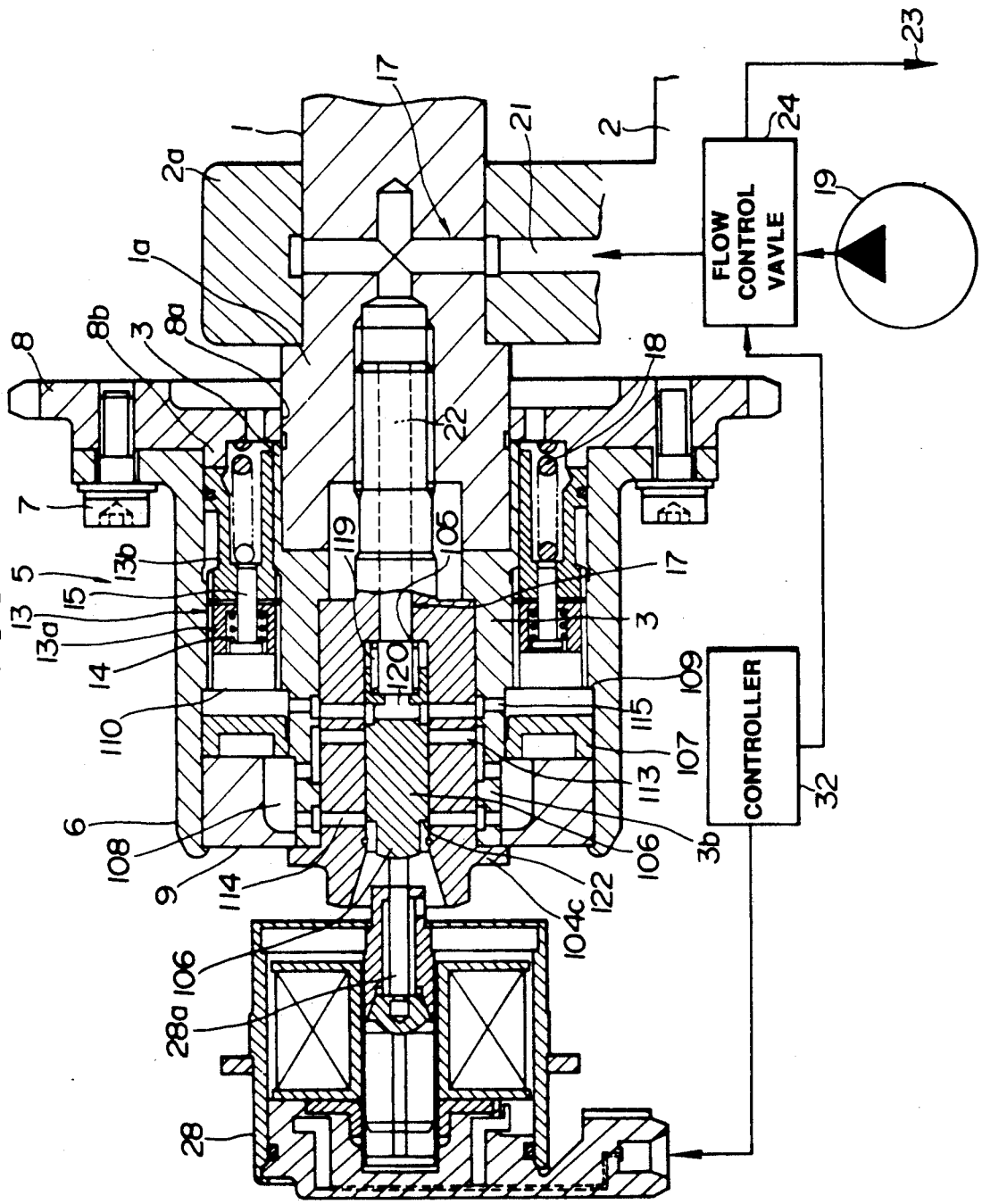
FIG. 5 is a similar section to FIG. 3 but showing different operational state to that of FIG. 3, which illustrates fully phase shifted position.

When the engine load is further grown to the high load range, the controller 32 switches the pressure control signal level from LOW level to HIGH level. As a result, the electromagnetic actuator 28 is energized to drive the plunger 28a, therefore, the valve spool 106 is driven rearwardly to establish fluid communication between the axial bore 105 and the radial path 107 and the radial path 104 to the axial bore. As a result, the fluid pressure in the second pressure chamber 110 is increased and, on the other hand, the first pressure chamber 108 is drained via the drain port 112. Therefore, the cylindrical gear assembly 13 is driven rearwardly independently of the ring member 107. The stroke of the cylindrical gear assembly 13 is maintained until the axial end of the gear element 13b abut against the annular projection 8b, as shown in FIG. 5. Therefore, the phase relationship between the timing sprocket 5 and the camshaft 1 becomes maximum advanced position.

Figure 6:
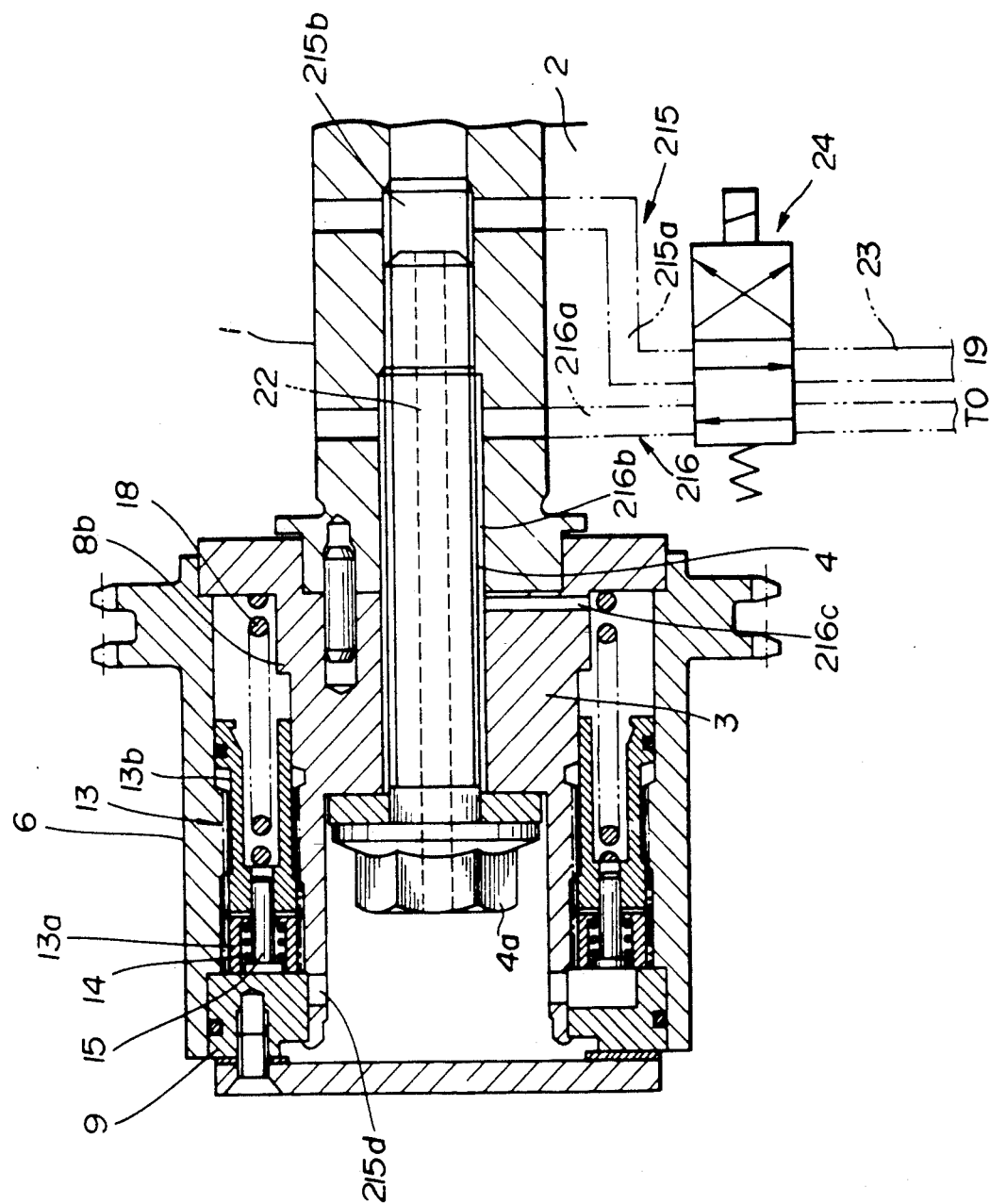
FIG. 6 is a section of the third embodiment of a valve timing control system according to the invention.

FIG. 6 shows another embodiment of the valve timing control system according to the present invention. In the shown embodiment, two mutually separated fluid circuits 215 and 216 are provided. The fluid circuit 215 has a section 215a extending through the cylinder head 2, an axial threaded bore chamber 215b formed through the camshaft 1, an axial path 215c formed through the fastening bolt 4. On the other hand, the circuit 216 has a section 216a extending through the cylinder head 2 essentially in parallel to the section 215a of the circuit 215, an annular path 216b which is formed between the outer periphery of the fastening bolt 4 and the inner periphery of the axis bore of the camshaft 1 and a radial path 216c formed through the inner cylindrical member 3. With the shown embodiment, the pressurized fluid is supplied to the pressure chamber 16 via a radial path 215d of the circuit 215. On the other hand, the pressurized fluid can also be supplied to the pressure chamber 212 formed at the side of the cylindrical gear assembly 13 remote from the pressure chamber 16.

In this embodiment, the pressurized fluid may be selectively supplied to the fluid circuits 215 and 216 depending upon the valve position of the flow control valve 23. For this, the flow control valve may be modified to perform three-way flow control function.

The shown embodiment may be advantageously introduced because it does not require complicated machining process for forming the fluid path opening in addition to the threaded bore for receiving the fastening bolt. Furthermore, in the shown embodiment, since the pressurized fluid is additionally supplied to the pressure chamber 212, the return spring 18 is required smaller spring force. Therefore, smooth and quick shifting of the cylindrical gear assembly 13 in valve timing advancing direction becomes possible. Therefore, quicker response to variation of the engine load becomes possible.

Furthermore, though the specific embodiment does not specifically accompany the means for realization, by appropriately controlling the fluid pressure to the pressure chambers 16 and 212, sequential valve timing control may be performed.

While the present invention has been discussed in terms of the preferred embodiment of the invention, the invention should not be appreciated to be specified in the shown embodiments. In fact, the invention can be implemented in various fashion. Therefore, the invention should be understood to include all possible embodiments and modifications which can be implemented without departing from the principle of the invention which set out in the appended claims.

What is claimed is:

1. A valve timing control system for an automotive vehicle, comprising:
   an engine revolution synchronous rotary element rotatingly driven in synchronism with engine revolution;
   a camshaft for driving intake and/or exhaust valve of an induction system of the engine;

a camshaft synchronous rotary element rotating in synchronism with engine revolution;

a phase adjusting means disposed between said engine revolution synchronous rotary element and said camshaft synchronous rotary element for adjusting rotational phase relationship between said rotary elements for adjusting rotational phase of said camshaft relative to engine revolution system;

a control means associated with said phase adjusting means, for actuating said phase adjusting means, for shifting said phase adjusting means between a minimum advance position corresponding to a predetermined minimum advanced phase of said camshaft relative to the engine revolution cycle and a maximum advance position corresponding to a predetermined maximum advanced phase of said camshaft relative to the engine revolution cycle, said control means actuating said phase adjusting means to said minimum advance position in response to low engine load condition and to said maximum advance position in response to high engine load; and means responsive to a predetermined medium load between said low and high load for restricting magnitude of shifting of said phase adjusting means to a predetermined medium advance position in which magnitude of phase shift of said camshaft is greater than that at said minimum advance position and smaller than that at said maximum advance position.

2. A valve timing control system as set forth in claim 1, wherein said controlling means comprises an electrical control unit which monitors engine driving condition to produce a valve timing control signal depending upon the engine load, and a hydraulic means including a pressure chamber defined in opposition to said phase adjusting means for exerting hydraulic force to shift said phase adjusting means, and a fluid pressure source unit for supplying pressurized fluid to said pressure chamber via a hydraulic circuit.

3. A valve timing control system as set forth in claim 2, wherein said control unit produce a first valve timing control signal in response to an engine load higher than a predetermined medium engine load criterion, and said hydraulic circuit includes a flow control valve selectively connecting said fluid pressure source unit to a supply line connected to said pressure chamber and to a drain path, said flow control valve being responsive to said first valve timing control signal to establish fluid communication between said fluid pressure source and said supply line.

4. A valve timing control system as set forth in claim 3, wherein said control unit produces a second valve timing control signal in response to an engine load higher than a predetermined high engine load criterion, and said hydraulic circuit includes a pressure control valve serving said shifting magnitude restricting means for adjusting the fluid pressure in said pressure chamber, said pressure control valve adjusting said fluid pressure in said pressure chamber at a predetermined first magnitude for placing said phase adjusting means to said predetermined medium advance position while said second valve timing control signal is absent and at a predetermined second magnitude for placing said phase adjusting means to said predetermined maximum advance position in response to said second valve timing control signal.

5. A valve timing control system as set forth in claim 4, wherein said pressure control valve includes a pressure relief means active while said second control signal is absent, to drain fluid pressure higher than said predetermined first magnitude.

6. A valve timing control system as set forth in claim 3, wherein said pressure chamber is separated into first and second chambers by a movable member, said movable member being oriented adjacent said phase adjusting means for shifting in phase advancing direction together with said phase adjusting means in response to the fluid pressure in said first chamber and said phase adjusting means being shifted in said phase advancing direction independently of said movable member in response to the fluid pressure in said second chamber.

7. A valve timing control system as set forth in claim 6, wherein said hydraulic circuit includes valve means operable between a first position for establishing fluid communication between said supply line and said first chamber and a second position for establishing fluid communication between said supply line and said second chamber.

8. A valve timing control system as set forth in claim 7, wherein said control unit produces a second valve timing control signal for driving said valve means between said first and second positions.

9. A valve timing control system as set forth in claim 8, wherein said shifting magnitude restricting means comprises a mechanical stopper means restricting stroke of said movable member which shifts in phase advancing direction together with said phase adjusting means in response to the fluid pressure in said first chamber.

* * * * *